United States Patent
Music

(10) Patent No.: US 10,574,320 B1
(45) Date of Patent: Feb. 25, 2020

(54) MATRIX METHODS TO SPEED PROCESSING FOR MVDR BEAMFORMING

(71) Applicant: Southwest Research Institute, San Antonio, TX (US)

(72) Inventor: Wayne D. Music, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 16/511,328

(22) Filed: Jul. 15, 2019

(51) Int. Cl.
*H04B 7/06* (2006.01)
*H01Q 3/26* (2006.01)
*H01Q 25/00* (2006.01)
*G01S 7/526* (2006.01)

(52) U.S. Cl.
CPC ............ *H04B 7/0617* (2013.01); *G01S 7/526* (2013.01); *G10K 2200/10* (2013.01); *H01Q 3/26* (2013.01); *H01Q 25/00* (2013.01)

(58) Field of Classification Search
CPC .... G10K 2200/10; G01S 7/526; H01Q 25/00; H01Q 3/26
USPC ........................................................ 375/267
See application file for complete search history.

(56) References Cited

U.S. PATENT DOCUMENTS

| 5,630,154 A * | 5/1997 | Bolstad ............... G06F 15/8046 |
| | | 342/159 |
| 2015/0200455 A1* | 7/2015 | Venkateswaran ...... H01Q 1/246 |
| | | 342/372 |

OTHER PUBLICATIONS

Schreiber, Robert, "Implementation of Adaptive Array Algorithms", IEEE Trans on Acoustics, Speech, and Signal Processing, Oct. 1986.
Bojanczyk, Adam W. et al, "Stabilized Householder Transformations", IEEE Trans on ASSP, Aug. 1989.
Bojanczyk, A. W. et al., "A Note on Downdating the Cholesky Factorization", SIAM J Sci. Stat. Comput., May 1987.
Cox, Henry, et al., "Robust Adaptive Beamforming", IEEE Trans. on ASSP, Oct. 1987.
Golub, Gene et al., Matrix Computations, Ch 5, 1983.

* cited by examiner

*Primary Examiner* — Leila Malek
(74) *Attorney, Agent, or Firm* — Livingston Law Firm

(57) ABSTRACT

A numerically stable and computationally efficient method for updating and downdating during MVDR (minimum variance distortionless response) adaptive beamforming. The method involves downdating and updating of the triangular (Cholesky) factor of the covariance matrix. The covariance matrix is never explicitly formed, but rather is partitioned and expanded after substituting in the Cholesky factors.

6 Claims, 2 Drawing Sheets

$$R_k = R_{k-1} + \underbrace{\chi_k \chi_k^\dagger}_{\text{UPDATING TERM}} - \underbrace{\chi_{k-N} \chi_{k-N}^\dagger}_{\text{DOWNDATING TERM}}$$

$\underbrace{\phantom{R_k}}_{\text{COVARIANCE MATRIX}}$ $$u_k(\theta_i, \phi_i) = w_i^\dagger(\theta_i, \phi_i)\chi_k = \frac{a^\dagger(\theta_i,\phi_i)R_i^{-1}\chi_k}{a^\dagger(\theta_i,\phi_i)R_i^{-1}a(\theta_i,\phi_i)}$$

$$u_k(\theta_i, \phi_i) = \frac{v_k^\dagger(\theta_i, \phi_i) z_k}{v_k^\dagger(\theta_i, \phi_i) v_k(\theta_i, \phi_i)}$$

FIG. 4

$$[L_{k-1}\ 0]\begin{bmatrix} L_{k-1}^\dagger \\ 0 \end{bmatrix} = [L_k\ \chi_{k-N}]\begin{bmatrix} L_k^\dagger \\ \chi_{k-N}^\dagger \end{bmatrix}$$

FIG. 5

$$F_k = [v_k(\theta_1, \phi_1), v_k(\theta_2, \phi_2), \cdots, v_k(\theta_K, \phi_K)]$$

FIG. 6

$$L_k L_k^\dagger = L_{k-1} L_{k-1}^\dagger - \chi_{k-N} \chi_{k-N}$$
$$F_k^\dagger F_k = F_{k-1}^\dagger F_{k-1} + A_k A_k^\dagger$$
$$L_k F_k = L_{k-1} F_{k-1}$$
$$F_k = L_l^{-1} L_{k-1} F_{k-1}$$

FIG. 7

$$Q_k = H_n H_{n-1} \cdots H_2 H_1$$

FIG. 8

$$W_n = \begin{bmatrix} L_{k-1}^\dagger \\ 0 \end{bmatrix} = Q_k \begin{bmatrix} L_k^\dagger \\ X_{k-N}^\dagger \end{bmatrix} = Q_k W_1$$

FIG. 9

| MVDR ALGORITHM | REAL MULTIPLIES | $10^6$ MULTIPLIES/SEC |
|---|---|---|
| WITH BACK-SUBSTITUTION | $10n^2 = 2n^2 m$ | 1100 |
| CURRENT ALGORITHM | $10n^2 = 20nm$ | 150 |
| n = 100 ELEMENTS | m = 137 BEAMS | 400 FREQUENCY CELLS/SEC |

FIG. 10

MATRIX METHODS TO SPEED PROCESSING FOR MVDR BEAMFORMING

TECHNICAL FIELD OF THE INVENTION

This invention relates to adaptive beamforming, and more particularly to beamforming using MVDR (minimum variance distortionless response) algorithms.

BACKGROUND OF THE INVENTION

Beamforming is a signal processing technique used in antenna arrays for directional signal transmission or reception. "Adaptive beamforming" is a technique in which an array of antennas achieves maximum reception in a specified direction by preferring the arrival of a signal from a desired direction while signals of the same frequency from other directions are suppressed. This is achieved by selectively weighting the signal data of the antenna elements in the array.

Adaptive beam forming is based on the fact that signals originating from different transmitters may occupy the same frequency channel but arrive from different directions. This spatial separation is exploited to separate a desired signal from undesired signals. Spatial selectivity is achieved by using adaptive receive or transmit beam patterns. The beam pattern is formed by adjusting complex weights of the antenna elements so that the beam is directed in a direction of interest. For receiving, information from different antennas is combined in such a way that an expected pattern of radiation is preferentially observed. For transmitting, a beamformer controls the phase and relative amplitude of the signal at each antenna and produces a directional beam in a desired direction.

Beamforming is accomplished either in the frequency domain or in the temporal domain. Beamforming algorithms use a covariance matrix, which carries the spatial and spectral information of the signals.

One adaptive beamforming approach is MVDR (Minumim Variance Distortionless Response), also sometimes also referred to as Capon beamforming. MVDR beamformers achieve good resolution, but the conventional MVDR algorithm has higher complexity due to a full-rank matrix inversion.

Adaptive beamforming when using MVDR applied to large antenna arrays has several hurdles to overcome. A high computational cost associated with a beamforming arrays with many elements is incurred when the beams are formed to cover all space (azimuth and elevation angles). This requires at least as many beams as elements and usually more. Another hurdle is that if the beamformer is to respond quickly to a changing environment then only a limited time is available to re-compute the covariance matrix. Again, this degrades the beamformer white noise intentional signal suppression capability and hence array gain.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates the incorporation of Cholesky factors to produce a pre-whitened steering vector and pre-whitened signal data vector.

FIG. 5 illustrates the Cholesky factor employed for the equation of FIG. 2.

FIG. 6 illustrates a mathematical structure for a matrix containing the steering vectors.

FIG. 7 illustrates a set of equations obtained from augmented matrices.

FIG. 8 illustrates a unitary matrix for downdating and updating as a sequence of Householder reflections.

FIG. 9 illustrates an augmented equation that is the basis of the downdating transformation.

FIG. 10 illustrates a comparison of conventional MVDR calculations and calculations using the method of the invention.

DETAILED DESCRIPTION OF THE INVENTION

Figures 1, 2, 3:
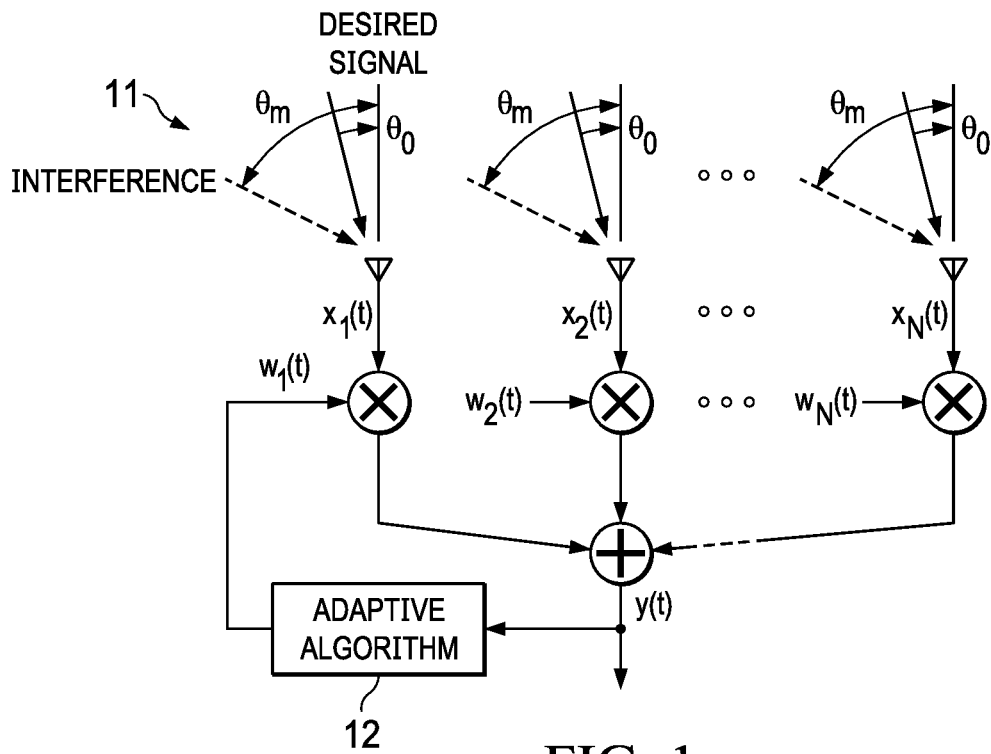
FIG. 1 illustrates an antenna array configured to performed MVDR adaptive beamforming in accordance with the invention.
FIG. 2 illustrates how updating and downdating are conventionally performed for the covariance matrix of an MDVR algorithm.
FIG. 3 illustrates the adaptive beam output for the antenna array of FIG. 1.

The following description is directed to an improved method for performing MVDR calculations. The method is useful for any MVDR application, but is particularly useful for adaptive beamforming in nonstationary environments where fast calculations are most needed. The method provides high computational efficiency and reduced computation time as compared to conventional MVDR calculation methods.

As indicated in FIG. 1, the method is implemented with an antenna array 11 having a number of antenna elements whose signals are processed adaptively. Each element of the adaptive antenna array is weighted. The weighted antennas are then summed at the beamformer's output such that the combined effect is a beam pattern pointing towards a desired direction for signal transmission or receiving.

A processing unit 12 receives and delivers signal data vectors and weight vectors to the antenna elements and has appropriate hardware and software to perform the method described herein. The method calculates MVDR beamformer weights, which when applied to the antenna elements steer the response of the antenna array in a specific direction or set of directions.

The MVDR algorithm first computes an optimal weight vector from an estimated covariance matrix and a steering array vector. The weight vector and signal data vector are then combined to give the beamformer's output. The steering array vector represents the direction of the desired signal. Mathematical expressions for the relationship between the weight outputs, covariance matrix, steering array vector, and input signal data array vector are known in the field of MVDR beamforming.

To obtain the optimum weights of the array, an ideal MVDR beamformer would use an exact covariance matrix of the signal data. In practice, it is not feasible to calculate the exact covariance matrix so an estimate of the covariance matrix is used. In addition, as the signal environment changes, the weight vectors must be updated ("adapted") to reflect varying conditions. This adaptive computation of covariance estimates results in a significant increase in the computational load of the array processor 12. The following method is directed to reducing the computational load.

A feature of the invention is that a covariance matrix is never explicitly formed. As explained below, updating and downdating of new and old data is employed within the MDVR algorithm. The key is combining Cholesky factorization of the covariance matrix with the updating or downdating.

To compute the beam outputs as new data arrives, the process of obtaining a new Cholesky factor is broken up into two steps. The first step is downdating—the processing associated with the subtraction of a downdating term. The second step is updating—the processing associated with the addition of an updating term.

FIG. 2 represents how updating and downdating is conventionally performed for the covariance matrix, R. The first term on the right side of the equation is the old covariance matrix, the second term is the updating term, and the third term is the downdating term.

FIG. 3 illustrates the adaptive beam output, where $\theta$ is the elevation, $\phi$ is the azimuth, $\alpha(\theta, \phi)$ is the array steering vector, and R is the estimated covariance matrix.

The covariance matrix can be factored into Cholesky factors (or any other factors). The covariance matrix is replaced with its Cholesky factors. In accordance with the method, the upper and lower Cholesky factors of the covariance matrix are combined with the input data and steering vectors within the MVDR algorithm. This generates prewhitened data and steering vectors and are the only quantities needed to compute the beam outputs.

With the MVDR algorithm described by prewhitened data and steering vectors, the problem is to determine the updated Cholesky factor based on the previous Cholesky factor and the downdating term. This is accomplished by the development of augmented matrices. Subsequently, the new algorithm shows that there is a unitary matrix representing the downdating transformation and similarly for updating. Further matrix manipulation allows for a development of matrices representing both downdating and updating procedures. From these matrix identities, a partitioning of them into a set of simultaneous equations is produced. From this, a matrix of prewhitened steering vectors as functions of azimuth and elevation is formed. This matrix is all that is needed to downdate. Similarly, another formed matrix of steering vectors is all that is needed to update.

FIG. 4 illustrates the incorporation of the Cholesky factors to produce, $v_k(\theta,\phi)$, representing the pre-whitened steering vector and, the pre-whitened data vector.

Updating and downdating of the covariance matrix is a known method to obtain a new estimate of the matrix for every new snapshot of data across the antenna array. With downdating and updating of the snapshot data vector, the covariance matrix never needs to be explicitly formed. This implies then that the inverse covariance matrix of FIG. 3 need not be calculated directly. This reduces substantially the expensive computations needed to find the covariance matrix as found in conventional methodologies.

FIG. 5 illustrates the Cholesky factor being employed upon FIG. 2 for the downdating step and putting the equation into matrix form.

All of the pre-whitened steering vectors must be downdated and updated. A matrix of pre-whitened steering vectors must be formed.

FIG. 6 illustrates the necessary structure for the matrix containing the steering vectors. This matrix is part of a set of partitioned matrices as explained below.

FIG. 7 is a set of equations obtained from manipulated augmented matrices generated through the use of a downdating transformation using a unitary matrix, $Q_k$. By forming the energy of these augmented matrices, A, this set of partitioned matrix equations is found as shown in FIG. 7. With these equations, the denominator of FIG. 4 can now be downdated.

The updating of the FIG. 4 denominator is developed similarly with different augmented matrices to generate another set of partitioned matrix equations.

A mechanism of the downdating and updating transformation is required in order for the overall algorithm to work. The determination of the transformation is required to complete the algorithm explained above. There are many ways to do this found in literature such as Givens rotations. For the embodiment of this invention, stabilized hyperbolic Householder reflections are used to perform the transformation. However, rather than perform brute force reflections on the covariance matrix, the Householder reflections were performed iteratively upon the appropriate Cholesky factor's column vectors and data vector.

FIG. 9 illustrates an augmented equation that is the basis of the downdating transformation. $L_k$ is the lower triangular Cholesky factor of $R_k$. $X_{k-N}$ has p columns of length n. The matrices $W_i$ are defined recursively by $W_{i+1}=H_iW_i$.

Each Householder reflection $H_i$ transforms the ith row and column of $W_1$ into $W_n$. After the last column is transformed, the result is FIG. 8.

The transformation matrix for both downdating and updating is a sequence of Householder reflections as illustrated in FIG. 8. There are other transformations that can be used besides the Householder. In this case a modified version of the Householder is employed, the stabilized hyperbolic Householder transformation. The method is to consider the problem of determining the transformation matrix, $Q_k$, such that FIG. 9 is operational for downdating and updating.

Methods known in the art of the linear algebra of Householder reflections mechanism (or any other transformational matrix) with energy conservation concept may be used to determine the required set of equations necessary to implement downdating of the Householder reflections transformation (or any other transformation) based on a matrix's column-by-column operation. The mechanism for updating the transformation matrix is similar but producing a different set of computational equations.

Referring again to FIG. 9, the augmented matrix equation has a mixture of known elements and unknown elements. By understanding the structure of the Cholesky factor, and the process by which the reflections are performed, a sequence of simple equations can be obtained as an algorithmic technique for updating. The method provides a significant decrease in computation time compared to conventional matrix methods used with the MVDR.

For updating, the known and unknown elements are not mixed on the same side of the equation as for downdating. Consequently, a new set of unique equations reflect the updating/reflections of the MVDR over time as new data is collected from the antenna array.

FIG. 10 illustrates a comparison of the conventional MVDR calculations (using back substitution) to the calculations of the method described herein. A tenfold decrease in the number of multiplies per second is noted for this method.

What is claimed is:

1. A method of performing efficient downdating and updating calculations for a Minimum Variance Distortionless Response (MVDR) adaptive beamforming system having an array of antenna elements, comprising:

calculating weights for the antenna elements, using an MVDR algorithm that calculates the weights based on a covariance matrix, input data values, and steering vector values;

performing a Cholesky factorization of the covariance matrix;

wherein the MVDR algorithm has a downdating term and an updating term, for downdating and updating the Cholesky factorization, respectively;

combining upper and lower Cholesky factors of the covariance matrix with input data vectors and steering vectors during computation of the MVDR algorithm, thereby generating pre-whitened input data vectors and steering vectors, as an alternative to re-forming and inverting the covariance matrix;

for downdating, subtracting the downdating term from a previous value of the Cholesky factorization; and for updating, adding the updating term to the difference between the Cholesky factorization and the downdating term;

wherein a unitary matrix is formed to represent a downdating or updating transformation.

2. The method of claim 1, wherein the unitary matrix is a sequence of Householder reflections.

3. The method of claim 2, wherein the Householder reflections are performed iteratively upon Cholesky column vectors and input data vectors.

4. The method of claim 2, wherein the Householder reflections are stabilized hyperbolic Householder reflections based on geometric considerations of the reflection's mechanism.

5. The method of claim 1, wherein the unitary matrix is used to form augmented matrices.

6. The method of claim 5, wherein the augmented matrices are used to form a set of partitioned matrix equations.

* * * * *